Aug. 16, 1955     O. HÄCKER     2,715,688
ELECTRO-HYDRAULIC POWER BRAKES
Filed Aug. 14, 1951
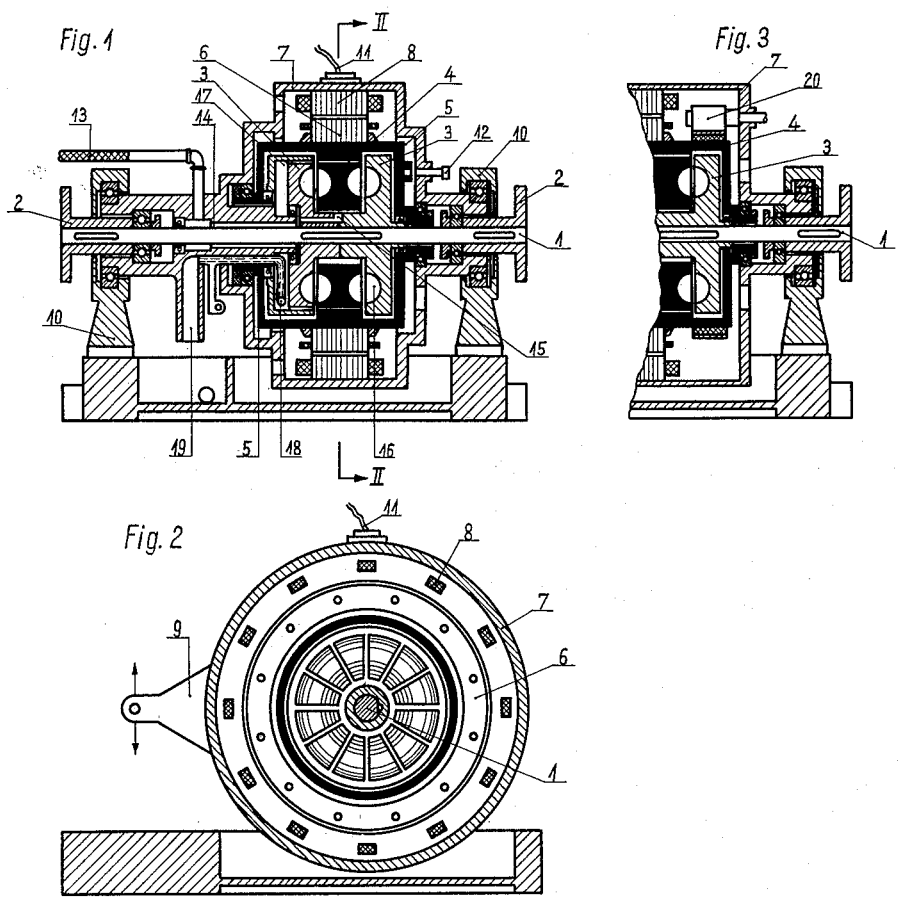
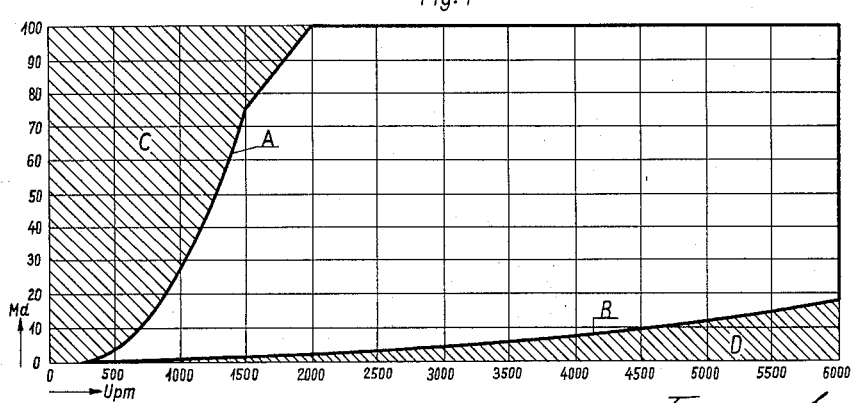
Inventor:
Otto Häcker

# United States Patent Office 2,715,688
Patented Aug. 16, 1955

2,715,688

ELECTRO-HYDRAULIC POWER BRAKES

Otto Häcker, Traisa, near Darmstadt, Germany, assignor to Carl Schenck Maschinenfabrik Darmstadt G. m. b. H., Darmstadt, Germany, a corporation of Germany Application August 14, 1951, Serial No. 241,793

Claims priority, application Germany August 28, 1950

9 Claims. (Cl. 310—93)

This invention relates to power brakes of the dynamometer type and has for its object to increase the braking power of dynamometers employed for power measurement, particularly those having a rotor and a stator, to permit measuring small torques at low speed of revolution.

Prior proposals suggest for this purpose to combine in one machine brakes of different types, e. g., to combine in one unit a friction brake with either a hydraulic brake or an electric re-generative brake.

The rotatable parts of such brakes are connected to the brake shaft partly by a direct coupling and partly by an indirect, e. g. a fluid coupling, and are partly mounted to oscillate. The part connected to the brake shaft by the indirect coupling constitutes the rotating part of an electrical machine, the stator of which is carried by the oscillatably mounted part. Such structures exhibit disadvantages which are overcome by the present invention.

The brake of this invention is operated throughout its different power ranges with known controls. The various controls may be used individually or selectively in any desired combination. A mechanical brake is provided which is subject to frictional control, a hydraulic brake is provided which responds to the admission of a working fluid and an electrical brake is provided which is responsive to variations in field excitation and, if desired, also to reversal of polarity, so that the rotor may be acted on both in the direction of rotation of the brake shaft and in the reverse direction. A friction brake may also be provided in an electro-hydraulic brake according to the invention.

A brake constructed in accordance with the invention provides a simple apparatus which is dependable in operation and which combines all known advantages of various types of brake. A further substantial advantage resides in the fact that the electrical brake may be operated in the manner of a generator and the current thus produced may be used as desired. The electrical brake may also be used in the nature of a motor, for example, to start the machine to be tested.

The invention will now be described by way of example, with reference to the accompanying diagrammatic drawings, in which:

Figure 1 shows an embodiment of the invention in longitudinal section;

Figure 2 is a transverse section along the line II—II in Figure 1;

Figure 3 illustrates a modification of the brake illustrated in Figure 1; and

Figure 4 is a diagram showing the operating range plotted against the speed of revolution.

The brake unit comprises the brake shaft 1, having flanges 2 to which may be coupled the machine to be tested. The two rotors 3 are firmly keyed to the shaft 1. The part 4 is rotatably mounted in the housing 7 through the medium of the end plates 5 and is hydraulically coupled for rotation with the rotors 3. The part 4 normally known as the stator in hydraulic brakes, is therefore connected to the brake shaft 1 by an indirect coupling. The rotors and the coacting part 4 are formed with the known pocket-like cavities 16. The part 4 carries peripherally the electrical armature winding 6 thus forming the rotor of the electrical part of the brake. The housing 7 carries poles 8, and consequently forms the stator for coaction with the rotor 4. The housing 7 is oscillatably suspended in the supporting bearings 10 of the brake unit, and is provided with the usual weighing lever arm 9 (Figure 2) for measuring the torque applied. The mounting of these three parts is in other respects believed to be apparent from Figure 1.

Fluid is supplied to the pockets 16 through the pipe 13 and the passages 14 and 15 and is passed to the chamber 17 from which it is drawn off to the outlet 19 through the intermediate pipes 18. Current is supplied to the electrical parts at 11 only at a time when such parts are to function as a motor to start the machine to be tested.

The brake unit may, if required, operate purely as an hydraulic eddy brake. The part 4 is, in this case, rigidly coupled to the housing 7, for example by means of the bolt 12, and the electrical parts remain unexcited. Or the unit may operate as an electro-hydraulic brake, in which case the part 4 and housing 7 are not coupled together. The electrical parts are then excited and the hydraulic part is filled with fluid to the degree depending on the brake power required. If the brake is to operate purely as an electrodynamic brake, the hydraulic part acts simply as a coupling between the brake shaft 1 and the part 4 serving as the rotor of the electrical part of the brake.

Depending on the excitation of the electrical parts, the rotor 4 may be caused to rotate in the same direction as the brake shaft 1 or in the opposite direction. If it rotates in the opposite direction, a relative movement between the rotor 4 and rotors 3, of 1600 R. P. M. may be obtained, for example, with a speed of only 100 R. P. M. of the brake shaft. The range of regulation of the brake, therefore is considerably in the direction towards lower speeds. Even with a low speed, a relatively large braking moment can still be applied to the brake shaft. If the electrical excitation is omitted, a small power at a high speed of revolution, can be braked because practically no reaction moment is then produced on the oscillatably mounted housing 7. The no-load power is thereby reduced to a minimum.

The invention is not inherently restricted to the exact construction shown and described in the foregoing which is given as an example only. It is, for example, possible to interchange the functions of the rotor 3 and part 4 in the electrical braking system.

In order to be able to meet any unusual requirements in respect of the brake power, the apparatus described may in accordance with the invention also include a friction brake. An example of such embodiment is shown in the fractional view shown in Figure 3. The friction brake 20 is mounted on the oscillating housing 7 and acts in known manner on the indirectly coupled part 4.

The power range of an ordinary hydraulic eddy brake can be considerably increased by the application of the principle of the invention as can be seen from the diagram in Figure 4. The curves A and B indicate the power of known hydraulic eddy brakes. The hatched area C is added by the creation of a counter-torque by means of the rotor 4, and the hatched area D is added if the rotor runs in the same direction as the brake shaft and the excitation is reduced or omitted. It will be seen that, for example at a very high speed (6000 R. P. M.), it is possible to run almost to zero torque. The minimum power is determined merely by air friction. At low speeds it is possible to run with full torque to zero speed by counter-operation.

A further substantial advantage of the new structure resides in the fact that the rotor 4 does not run at the full speed of the brake shaft. Its speed may amount only to a fraction of that of the brake shaft, generally however lying in the range of half the brake shaft speed. The rotor is therefore not excessively strained by centrifugal forces even at a high speed of the machine to be tested.

Since the parts 3 and 4 of the hydraulic brake act as an hydraulic coupling between the brake shaft 1 and the electrical part, it is, as previously indicated, possible to use the electrical part, by suitably supplying current, as a motor, for example for starting-up a machine to be tested. The torque transmitted from the electrical part to the brake shaft 1 may in such case be gradually increased by regulating the flow of the hydraulic fluid by suitable control means.

Current generated by the electrical part during a power measurement may be used as desired, e. g., may be supplied to an electrical network. No special electrical control equipment is needed for this purpose. By a suitable slip in the hydraulic part of the brake by regulating the admission of fluid, the part 4 can be run at a constant speed, independently of any variation in the speed of the brake shaft 1.

Changes may be made within the scope and spirit of the appended claims.

I claim:

1. A dynamometer comprising a rotatable brake shaft, a first hydraulic brake element directly coupled for rotation with said brake shaft, a second hydraulic brake element indirectly coupled for rotation with said first brake element, and a third brake element including a housing oscillatably mounted on said brake shaft, electrical rotor armature means extending from said second brake element, electrical stator pole means for coaction with said armature means carried by said third brake element, said rotatable brake shaft being common to said first hydraulic brake element and said electrical rotor armature, and said housing for said third brake element operatively enclosing said first and second hydraulic brake element.

2. The structure defined in claim 1, together with friction brake means carried by said third brake element for braking coaction with said second brake element.

3. The structure defined in claim 1, together with means for rigidly interconnecting said second and third brake elements.

4. A hydraulic dynamometer comprising a mounting, a housing rotatably disposed on said mounting, a brake shaft rotatably disposed in said housing, a hydraulic brake element rotatably disposed in said housing, means for hydraulically coupling said brake element with said brake shaft, electrical rotor armature means extending from said hydraulic brake element, electrical stator pole means for coaction with said armature means carried by said housing, and said housing operatively enclosing said hydraulic brake element and said means for hydraulically coupling said brake element with said brake shaft.

5. The structure defined in claim 4, together with friction brake means carried by said housing for braking coaction with said hydraulic brake element.

6. The structure defined in claim 4, together with means for rigidly interconnecting said housing with said hydraulic brake element.

7. A dynamometer including a fluid unit and an electro-magnetic unit and comprising a stationary mounting, a housing rotatably journalled on said mounting, a brake shaft rotatably journalled in said housing, a rotor rotatably separately journalled in said housing, rotor drive means keyed to said shaft for rotation therewith, means for circulating a fluid to said rotor drive means for coupling said rotor for coaction therewith, pole means carried by housing inside thereof, armature means extending from said rotor for electro-magnetic coaction with said pole means, and said housing operatively enclosing said rotor and said rotor drive means, whereby a compact dynamometer is formed with the housing being common to the fluid and electro-magnetic units.

8. The structure defined in claim 7, together with friction brake means carried by said housing for applying a brake force to said rotor.

9. The structure defined in claim 8, together with key means for locking said rotor to said housing.

References Cited in the file of this patent

UNITED STATES PATENTS

| 854,996 | Garland | May 28, 1907 |
| 1,892,295 | Walker | Dec. 27, 1932 |
| 2,021,880 | Anderson | Nov. 26, 1935 |
| 2,237,907 | Landis | Apr. 8, 1941 |
| 2,355,484 | Teker | Aug. 8, 1944 |
| 2,551,079 | Winther | May 1, 1951 |

FOREIGN PATENTS

| 803,297 | France | June 29, 1936 |